United States Patent [19]

Massieon et al.

[11] 3,955,855
[45] May 11, 1976

[54] WEAR-RESISTANT COMPOSITE TRACK LINK

[75] Inventors: Charles G. Massieon; Chris Robert Straesser, both of East Peoria, Ill.

[73] Assignee: Caterpillar Tractor Co., Peoria, Ill.

[22] Filed: Apr. 17, 1975

[21] Appl. No.: 568,951

[52] U.S. Cl. ............................... 305/38; 74/250 R
[51] Int. Cl.² ................. B62M 27/02; B62D 55/24
[58] Field of Search ............... 305/38, 35 R, 16, 17, 305/18, 21, 22, 23, 24, 25, 26, 27, 33, 52, 53, 56; 180/5 R, 9.5; 74/237, 247, 250 R

[56] References Cited
UNITED STATES PATENTS 1,979,592  11/1934  Weiss ........................... 74/250 R X
3,722,961   3/1973  Haley ................................. 305/38

Primary Examiner—Philip Goodman
Attorney, Agent, or Firm—Wegner, Stellman, McCord, Wiles & Wood

[57] ABSTRACT

A track-type vehicle having a track made up of links with contact surfaces of high wear-resistant material engaging with the track rollers as the track is driven on the vehicle. The high wear-resistant material may be a composite alloy metallurgically bonded into a groove in the contact surface.

9 Claims, 3 Drawing Figures

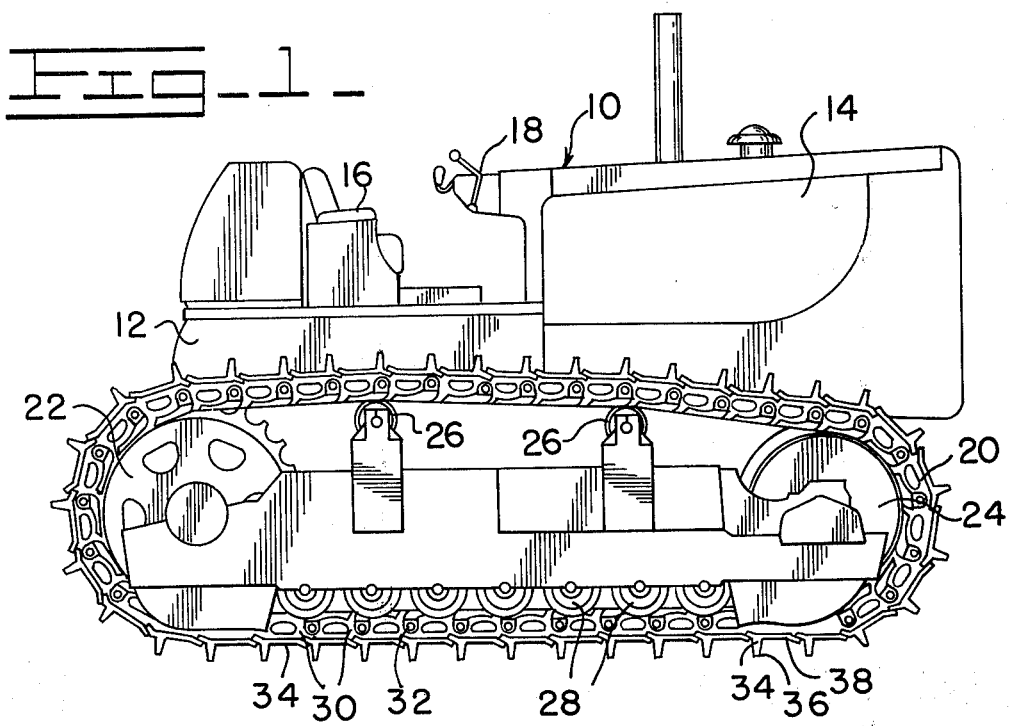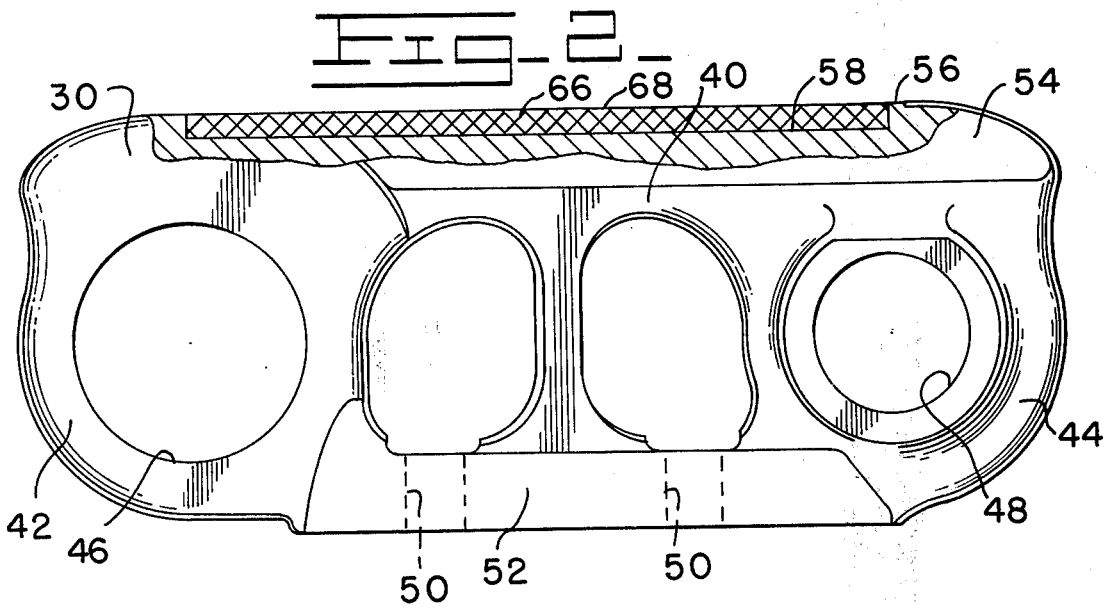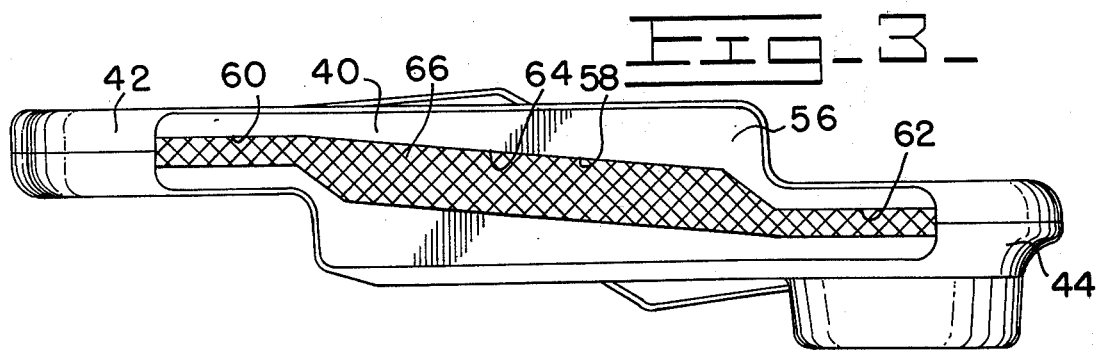

WEAR-RESISTANT COMPOSITE TRACK LINK

BACKGROUND OF THE INVENTION

This invention relates to track-type vehicles and, more particularly, to an improved wear-resistant contact surface for the roller engaging portion of the link.

DESCRIPTION OF THE PRIOR ART

In track-type vehicles, there has long been a problem of wear on the contact surfaces of the links of the tracks where said links contact the various rollers as the continuous track tranverses its predetermined path on the vehicle. All parts of the track of a track-type vehicle are subjected to constant exposure to highly abrasive soil, sand, rock and the like, and this is particularly true of the surfaces of the links of the track where said links come in contact with the various track rollers, such as the idler rollers and guide rollers. That is, since the links are not positively driven by the particular rollers, there is a tendency for the links to slide as well as roll relative to the rollers which combined action takes place with soil, sand or rock particles therebetween, thus subjecting the contact surfaces of the links to considerable wear.

When the wear on the links reaches a critical stage, either the link fails, dropping the track from the vehicle, or the worn portions cause excess slop and bumping between the track and each roller resulting in needless noise and vibration to the vehicle. Under either circumstance, the track must be repaired generally by replacing the worn links which results in down time for the vehicle and considerable expense for the new links and for the labor of replacing same.

SUMMARY OF THE INVENTION

Each link in a track of a track-type vehicle has a surface that is in contact with the various rollers of the drive train of the track. A hard wear-resistant insert is metallurgically bonded into a groove in said surface of the link so as to reduce the wear on said surface. The wear-resistant insert considerably extends the useful life of the links and eliminates the expense of removing the vehicle from service and repairing or replacing the worn links.

The wear-resistant insert may be made up of any one of the high strength alloy steels or one of the composite alloys having extemely hard particles bonded into a more ductile matrix material. The composite alloys may be spherical boride particles or tungsten carbide particles bonded in a matrix material of brazing alloy, alloy steel or an iron, carbon, nickel alloy.

BRIEF DESCRIPTION OF THE DRAWINGS

The details of construction and operation of the invention are more fully described with reference to the accompanying drawings which form a part hereof and in which like reference numberals refer to like parts throughout.

In the drawings:

FIG. 1 is an elevational view of a track-type vehicle, and in particular a crawler vehicle;

FIG. 2 is an enlarged elevational view, with a part broken away and in section, of a link of the track of the vehicle of FIG. 1; and, FIG. 3 is a plan view of the link of FIG. 2 showing the wear-resistant insert bonded in position.

DESCRIPTION OF THE PREFERRED EMBODIMENT

Referring to the drawings, and in particular to FIG. 1, a track-type vehicle 10 is shown and comprises a chassis 12 upon which is mounted an engine 14, an operator station 16, controls 18 and a pair of ground engaging tracks 20. The tracks 20 are operatively driven by the engine 14 through a power train (not shown), said power train connecting to and driving the sprockets 22 which lays down the tracks 20 for moving the vehicle. The track 20 is mounted for continous rotation relative to the chassis by means of an idler roller 24, carrier rollers 26, and plural track rollers 28, all in a conventional fashion and none of which forms a part of the invention.

The track 20 is made up of links 30, which are pinned together by pivot pins 32 for relative movement, and track shoes 34, with one track shoe being bolted to each pair of side-by-side links 30. The track shoes 34 have grouser bars 36 projecting outwardly from a base plate 38 with said grouser bars 36 providing the principle traction for the vehicle. From FIGS. 2 and 3, it can be seen that each link 30 has a body portion 40 with a forward portion 42 offset or displaced laterally (see FIG. 3) from the rearward portion 44. A pivot opening 46 passes through portion 42 and pivot opening 48 passes through portion 44. When assembled, an offset forward portion 42 of one link nests beside the rearward portion 44 of the next adjacent link. Each link 30 has a mate which has the rearward portion displaced in the opposite direction from that shown in FIG. 3 so that a pivot pin 32 through the openings 46 in the forward portions 42 of two side-by-side links will also pass through the openings 48 in the rear portions 44 of the next adjacent pair of links. Spacers (not shown) are also provided between the forward portions 42 of the adjacent links to properly space the links for traversing the teeth on the sprocket 22.

The body portion 40 of the link 30 has a pair of apertures 50 through one wall 52, which apertures are used to permit bolts to pass for securing the track shoe 34 thereto. The opposite wall 54 of the link 30 is referred to as the roller contact wall and has a contact surface 56 in which a slot or groove 58 is milled or machined. The slot or groove 58 has two straight narrow end portions 60,62, as viewed in FIG. 3, with a wider angled central portion 64 extending between said end portions 60,62. A shaped slug or bar 66 of hard wear-resistant material is bonded into said slot or groove 58 and has a contact surface 68 lying in the same plane as the contact surface 56 of the link. The hard wear-resistant material of the slug or bar 66 presents a contact surface to the various rollers which will wear, if at all, at a very slow rate thereby substantially eliminating repair or replacement of the links due to wear. The offset shape of the bar 66 is such as to present a maximum wear-resistant contact surface at those localized areas of the link that have been found in the past to receive the greatest amount of abrasive action from the rollers.

The ultimate success of the use of a hard wear-resistant bar of material in Ser. No. contacting surface of the link lies in the proper selection of materials best able to withstand the particular wear to which the links are subjected. In that context, the copending application of Eugene Lee Helton, et al. application ser. no. 466,142 entitled "Composite Wear-Resistant Alloy, and Tools From Same", filed May 2, 1974 and assigned to the common assignee of the present application, sets forth some of the preferred materials found to work successfully when bonded to the link 30. We will not repeat, in detail, the whole inventive concept of said application, but we refer interested parties to said application for details. For our purposes, said application of Helton et al. discloses wear-resistant alloys in spherical particles of boron, chromium and iron incorporated in a matrix of different material. Examples of two specific composite alloys are as follows:

1. Hard Spherical Particles made of:

| (A) | Boron | 8.8% by weight |
|---|---|---|
| | Chromium | 25 % by weight |
| | Iron | 66.2% by weight | or

| (B) | Boron | 9 % by weight |
|---|---|---|
| | Chromium | 62.5% by weight |
| | Carbon | 1.8% by weight |
| | Iron | Balance |

(2). The spherical particles are then bonded in one of the following matrix materials: (C) AMI 790 (0.03% C; 3.5% Si; 1.5% B; 1.25% Fe; balance 94% Ni) or (D) AMI 930 (0.07% C; 7% Si; 5% Cu; 23% Mn; balance 65% Ni) The ratio of (1) Spherical Particles (A) or (B) is 55-70% to (2) matrix (C) or (D) is 30-45%.

The composite alloy has extremely hard wear-resistance characteristics and when formed into a slug or bar 66 and bonded, as by brazing, into the groove 58 in the more ductile link 30, a wear surface 68 of long-lasting durability results. The links 30 are cast or rolled from fairly ductile steel, such as a modified SAE 1037 steel, comprised of 0.32–0.40% carbon; 0.05% sulpher; 1.30–1.65% manganese; 0.04% phosphorus; and 0.15 to 0.30% silicon. The steel of the links 30 should be relatively easy to machine so that the apertures 50 and the grooves or slots 58 can be formed therein.

The composite alloy may also be made up of tungsten carbide particles in a matrix of a more ductile material, for instance, a brazing alloy, an alloy steel or an iron-carbon-nickel alloy. The ratio of particles to matrix should remain roughly in the range of 55–70% tungsten carbide particles to 30–45% matrix material.

Although other hard wear-resistant materials maybe used to form the bar 66 for the contact surface 68, as long as they meet the wear characteristics that will prolong the useful life of the links of the track, they do not produce the extremely satisfactory results obtained from the use of the composite alloys, such as boron-chromium-iron particles, in a brazing alloy matrix.

The slug or bar 66 of composite alloy is brazed into the groove or slot 58 of the link 30 whereupon the links 30 and track shoes 34 are assembled into a track 20 which is then mounted on the vehicle. The surface 68 of the link 30 is highly resistant to wear thereby extending the life span of use of the links considerably with the attendant savings of time and material. The more ductile material of the link forms an excellent backing for the hard and brittle wear-resistant material of the bar 66, thereby eliminating some of the chipping and breaking problems of unbacked wear-resistant materials.

The slug or bar 66 of high wear-resistant material bonded to the link covers a relatively small percentage of the total wear surface of the link and yet the life cycle of the link is greatly prolonged. It should also be noted that the slug or bar 66 is located in a part of the link that does not require the usual high ductility required of the balance of the link thereby in no way adversely affecting the operation or functioning of the link.

What is claimed is:

1. In a vehicle having a track made up of a plurality of interconnected links, roller means on said vehicle over which said links of said track pass, a contact surface on each of said links engaging with said roller means as said links pass said roller means, said contact surface having a bar of hard wear-resistant material bonded in a groove formed in said link whereby said contact surface will resist wearing away due to said contact with said roller means.

2. In a track as claimed in claim 1 wherein said wear-resistant material of said bar is a high strength alloy steel.

3. In a track as claimed in claim 1 wherein said wear-resistant material of said bar is a composite alloy of hard particles bonded into a more ductile matrix material.

4. In a track as claimed in claim 3 wherein said hard particles are boron, chromium and iron particles.

5. In a track as claimed in claim 3 wherein said matrix material is a brazing alloy.

6. In a track as claimed in claim 3 wherein said hard particles are boron, chromium and iron particles and said matrix material is a brazing alloy.

7. In a track as claimed in claim 3 wherein said hard particles are tungsten carbide particles.

8. In a track as claimed in claim 3 wherein said matrix material is selected from the group including brazing alloy, alloy steel, or an iron-carbon-nickel alloy.

9. A link for a track of a track-type vehicle, a roller contact surface on said link, said contact surface having a groove formed therein, a bar of hard wear-resistant material bonded in said groove whereby said contact surface will resist wear, wherein said wear-resistant material of said bar is a composite alloy of hard particles bonded into a more ductile matrix material.

* * * * *

UNITED STATES PATENT AND TRADEMARK OFFICE
CERTIFICATE OF CORRECTION

PATENT NO. : 3,955,855
DATED : May 11, 1976
INVENTOR(S) : Charles G. Massieon & Chris Robert Straesser It is certified that error appears in the above-identified patent and that said Letters Patent are hereby corrected as shown below:

Column 1, line 14, change "transverses" to read --traverses--.

Column 2, line 63, cancel "Ser. No." and insert therefor --the roller--.

*Signed and Sealed this*

Fourteenth *Day of* September 1976

[SEAL]

Attest:

RUTH C. MASON
*Attesting Officer*

C. MARSHALL DANN
*Commissioner of Patents and Trademarks*